(12) United States Patent
Ljung

(10) Patent No.: US 8,644,871 B2
(45) Date of Patent: Feb. 4, 2014

(54) METHOD AND ARRANGEMENT FOR MAINTAINING CELL COVERAGE

(75) Inventor: Petter Ljung, Stockholm (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 199 days.

(21) Appl. No.: 13/254,538

(22) PCT Filed: Mar. 9, 2009

(86) PCT No.: PCT/SE2009/050241
§ 371 (c)(1),
(2), (4) Date: Sep. 2, 2011

(87) PCT Pub. No.: WO2010/104426
PCT Pub. Date: Sep. 16, 2010

(65) Prior Publication Data
US 2012/0028669 A1    Feb. 2, 2012

(51) Int. Cl.
*H04B 7/00* (2006.01)
*H04W 72/00* (2009.01)

(52) U.S. Cl.
USPC .......................................... 455/517; 455/453

(58) Field of Classification Search
USPC ........ 455/67.13, 453, 446, 436; 370/310–350
See application file for complete search history.

(56) References Cited

U.S. PATENT DOCUMENTS

| | | | |
|---|---|---|---|
| 6,445,924 B1 * | 9/2002 | Rasanen | 455/437 |
| 7,466,682 B1 * | 12/2008 | Ribas et al. | 370/342 |
| 7,899,011 B2 * | 3/2011 | Petrovic et al. | 370/329 |
| 8,175,604 B2 * | 5/2012 | Lohr et al. | 455/442 |
| 2009/0093234 A1 * | 4/2009 | Cai et al. | 455/411 |
| 2009/0116389 A1 * | 5/2009 | Ji et al. | 370/235 |
| 2010/0075654 A1 * | 3/2010 | Cheng | 455/419 |

FOREIGN PATENT DOCUMENTS

| | | |
|---|---|---|
| EP | 1679933 A2 | 7/2006 |
| EP | 1931166 A1 | 6/2008 |

OTHER PUBLICATIONS

Official Action issued on Jul. 18, 2012 in corresponding European Application No. 09 788 503.2, 4 pages.
Official Action issued on Feb. 22, 2013 in corresponding Japanese Application No. 2011-553977, 3 pages.
Vodafone Group, Airvana, AT&T, ip.access, Orange, picoChip Designs, Qualcomm Europe, Text proposal for HNB TR25.9xx: Guidance on UL interference mitigation, 3GPP TSG-RAN WG4 (Radio) Meeting #48bis R4-082316, Oct. 3, 2008, 10 pages.

* cited by examiner

*Primary Examiner* — Andrew Wendell
*Assistant Examiner* — Maryam Soltanzadeh
(74) *Attorney, Agent, or Firm* — Rothwell, Figg, Ernst & Manbeck, P.C.

(57) ABSTRACT

The present invention relates to an arrangement, a communication network node and a user equipment allowing for maintaining cell coverage in a communication network system as well as a method for such maintained cell coverage. The communication network system comprising a plurality of communication network nodes (15a, 15b) communicating with one or more user equipments (18), where each network node (15a, 15b) is serving at least one cell (19) in which the user equipments (18) are situated. The method comprises the steps of: collecting (51) measurement reports from the user equipments (18) within the at least one cell (19); analyzing (52) collected measurement reports from at least some of the user equipments (18) for determining the proximity of these user equipments (18) to an uplink coverage limit (20); setting (53) a noise rise threshold based on the determined proximity of these user equipments (18) to the uplink coverage limit (20); implementing (55) the set noise rise threshold in the network node (15a, 15b) serving the at least one cell (19).

18 Claims, 6 Drawing Sheets

METHOD AND ARRANGEMENT FOR MAINTAINING CELL COVERAGE

CROSS-REFERENCE TO RELATED APPLICATION

This application is a 35 U.S.C. §371 National Phase Entry Application from PCT/SE2009/050241, filed Mar. 9, 2009, and designating the United States.

TECHNICAL FIELD

The present invention relates to a method, an arrangement and a communication network node in a communication network system as well as a user equipment and, more particular to arrangements, communication network nodes and user equipments allowing for maintaining cell coverage in a as well as a method for such maintained cell coverage.

BACKGROUND

A fundamental parameter in communication network systems comprising High Speed Uplink Data Access (HSUPA) operation is the noise rise threshold. Its purpose is to limit the amount of noise rise generated by the HSUPA users so that coverage for all services is maintained. An excessive noise rise causes a cell in such a communication network to shrink (cell breathing) something that could lead to that User Equipments (UE) distant to the Radio Base Station (RBS) experience poor uplink quality or even drop their connections.

The current best-practice is to set the noise rise threshold to a fixed value. This value should be selected as a good trade-off between HSUPA capacity and peak-rates on one hand and probability of uplink (UL) coverage in the cell on the other hand. Since the UL coverage probability is cell specific this analysis needs to be done on a per cell basis.

However, there are some problems with the current solutions. Firstly, the process of finding a good trade-off for the setting of the noise rise threshold in a cell is cumbersome, requiring an analysis of the coverage situation in each cell. Moreover, as the network evolves, e.g. new sites are added, new subscriber behaviour is introduced etc., the coverage situation in the cell will change, so that the process of finding a good trade-off must be repeated.

Further, even if a noise rise threshold is maintained in each cell in the network these noise rise thresholds are still set to fixed values. As a consequence, during time periods when no or few UEs are close to an uplink coverage limit, the uplink spectrum may be under-utilized, leading to decreased HSUPA capacity and peak-rates. Vice versa, during time periods when many UEs are close to an uplink coverage limit the uplink spectrum may be over-utilized leading to poor uplink quality or dropped calls.

SUMMARY

Accordingly, one objective with the present invention is to provide an improved method of maintaining cell coverage in a communication network system comprising a plurality of communication network nodes communicating with one or more user equipments, where each network node is serving at least one cell in which the user equipments are situated.

According to a first aspect of the present invention this objective is achieved through a method which comprises the steps of: collecting measurement reports from the user equipments within the at least one cell; analyzing collected measurement reports from at least some of the user equipments for determining the proximity of these user equipments to an uplink coverage limit; setting a noise rise threshold based on the determined proximity of these user equipments to the uplink coverage limit; and implementing the set noise rise threshold in the network node serving the at least one cell.

A further objective of the present invention is to provide an improved arrangement of maintaining cell coverage in a communication network system comprising a plurality of communication network nodes communicating with one or more user equipments, where each network node is serving at least one cell in which the user equipments are situated.

According to a second aspect of the present invention this further objective is achieved through an arrangement which comprises: a receiver arranged to collect measurement reports from the one or more user equipments within the at least one cell; a radio network controller arranged to analyze collected measurement reports from at least some of the user equipments for determining the proximity of these user equipments to an uplink coverage limit; the radio network controller further being arranged to set a noise rise threshold based on the determined proximity of these user equipments to the uplink coverage limit; and a communication arrangement arranged to communicate the set noise rise threshold from the radio network controller to the network node serving the at least one cell for implementing the set noise rise threshold in that cell.

A yet further objective of the present invention is to provide an improved communication network node for enabling maintained cell coverage in a communication network system comprising a plurality of communication network nodes communicating with one or more user equipments, where each network node is serving at least one cell in which the user equipments are situated.

According to a third aspect of the present invention this further objective is achieved through a communication network node which comprises: a receiver arranged to collect measurement reports from the one or more user equipments within the at least one cell; a radio network controller arranged to analyze collected measurement reports from at least some of the user equipments for determining the proximity of these user equipments to an uplink coverage limit; the radio network controller further being arranged to set a noise rise threshold based on the determined proximity of these user equipments to the uplink coverage limit; and a communication arrangement arranged to communicate the set noise rise threshold from the radio network controller to the network node serving the at least one cell for implementing the set noise rise threshold in that cell.

A still further objective of the present invention is to provide an improved user equipment for enabling maintained cell coverage in a communication network system, the user equipment being arranged to transmit measurement reports comprising at least one of user equipment transmit power information and received signal code power information over a radio interface in a communication network system comprising communication network nodes each serving at least one cell in which the user equipments are situated.

According to a fourth aspect of the present invention this further objective is achieved through a user equipment where the information in the measurement reports is adapted to facilitate: analysis by a radio network controller for determining the proximity of the user equipment to an uplink coverage limit; and setting by the radio network controller of a noise rise threshold based on the determined proximity of the user equipment to the uplink coverage limit; and communication by a communication arrangement of the set noise rise threshold from the radio network controller to the network node serving the at least one cell for implementing the set noise rise threshold in that cell.

Further embodiments are listed in the dependent claims.

Thanks to the provision of a method, an arrangement, a communication network node and a user equipment which provides for maintained cell coverage in a communication network system several advantages are provided.

Using the teachings of the invention no complex task involving time-consuming analysis of coverage situation of a cell is required but a noise rise threshold for the cell may be set automatically.

As the network evolves, e.g. new sites are added, new subscriber behavior introduced etc., the time-consuming analysis would previously have had to be repeated. Using the teachings of the invention this repeated analysis is no longer required as the noise rise threshold is maintained automatically.

The teachings of the invention allows for the noise rise threshold to change dynamically depending on the instantaneous location of the UEs. This means that the previous trade-off between HSUPA capacity and peak rates on one hand and uplink quality on the other hand is no longer needed. The teachings of the invention will allow for both high HSUPA capacity and peak rates and good uplink quality for the connections in the cell. This means that the noise rise threshold may adapt to the instantaneous location of the UEs in a cell.

Still other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings, wherein like reference characters denote similar elements throughout the several views.

DETAILED DESCRIPTION

Figure 1:
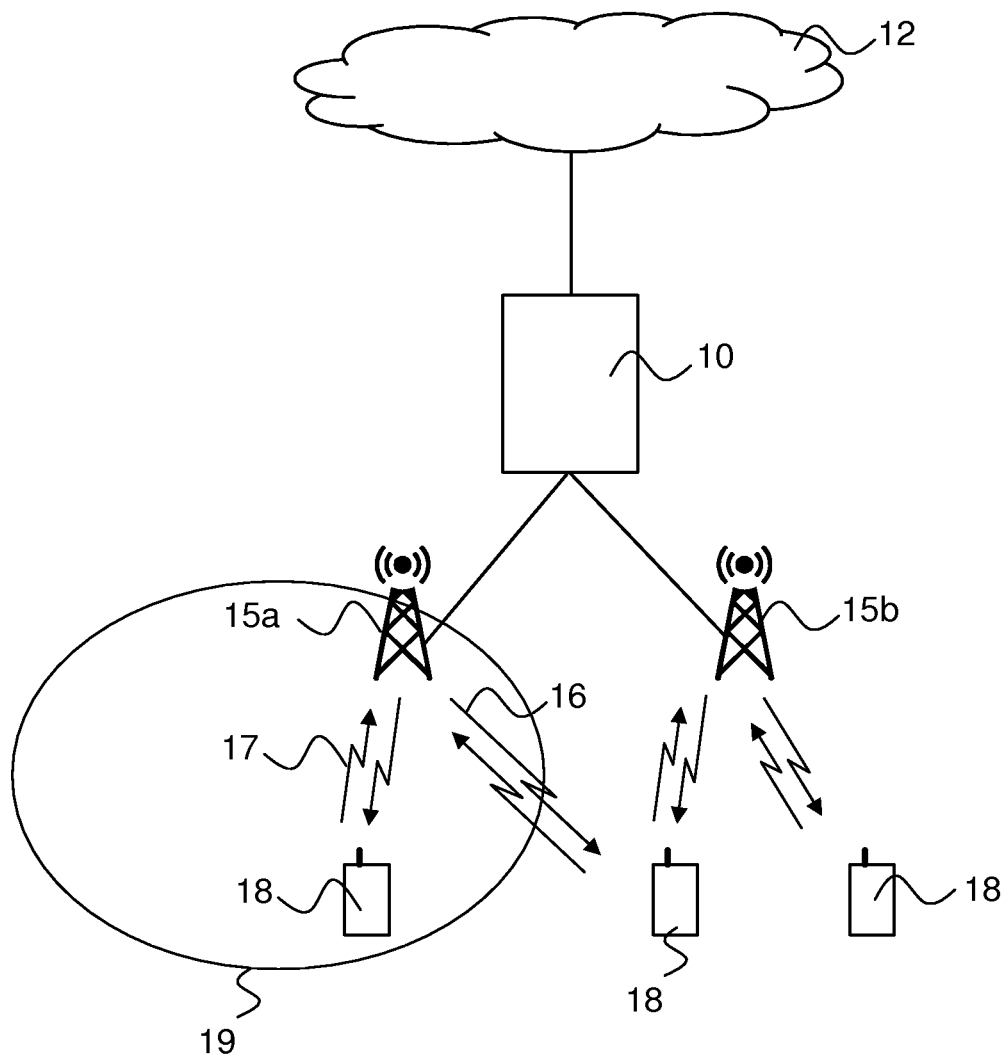
FIG. 1 is a schematic illustration of a communication network architecture according to the present invention.

FIG. 1 depicts a communication system including a Radio Access Network (RAN), such as the UTRAN architecture, comprising at least one Radio Base Station (RBS) 15 (two are shown in FIG. 1) connected to a controller unit, such as a radio network controller node (RNC) 10. The RAN is connected to a Core network (CN) 12. The RAN and the CN 12 provide communication and control for a plurality of user equipments (UE) 18 that each uses downlink (DL) channels 16 and uplink (UL) channels 17. For the reason of clarity, only one uplink channel is denoted 17 and one downlink channel denoted 16. On the downlink channel 16, the RBS 15 transmits data blocks to each UE 18. On the uplink channel 17, the UEs 18 transmit data blocks to the RBS 15.

According to a preferred embodiment of the present invention, the communication system is herein described as a WCDMA communication system. The skilled person, however, realizes that the inventive method and arrangement works very well on other communications systems as well, such as other CDMA based communications systems. The UEs 18 may be mobile stations such as mobile telephones ("cellular" telephones) and laptops with mobile termination and thus may be, for example, portable, pocket, hand-held, computer-included or car-mounted mobile devices which communicate voice and/or data with the RAN.

The present invention is based on the realization that in order to increase HSUPA capacity and peak-rates and promote good utilization of the uplink spectrum whilst at the same time maintaining high uplink quality and avoiding dropped calls the noise rise threshold in the cell may set in a dynamic manner based on UE measurement reports. The UE measurement reports in the cell are analyzed to find out how many UEs are close to the uplink coverage limit, and the noise rise threshold in the cell is adjusted accordingly.

Figure 2:
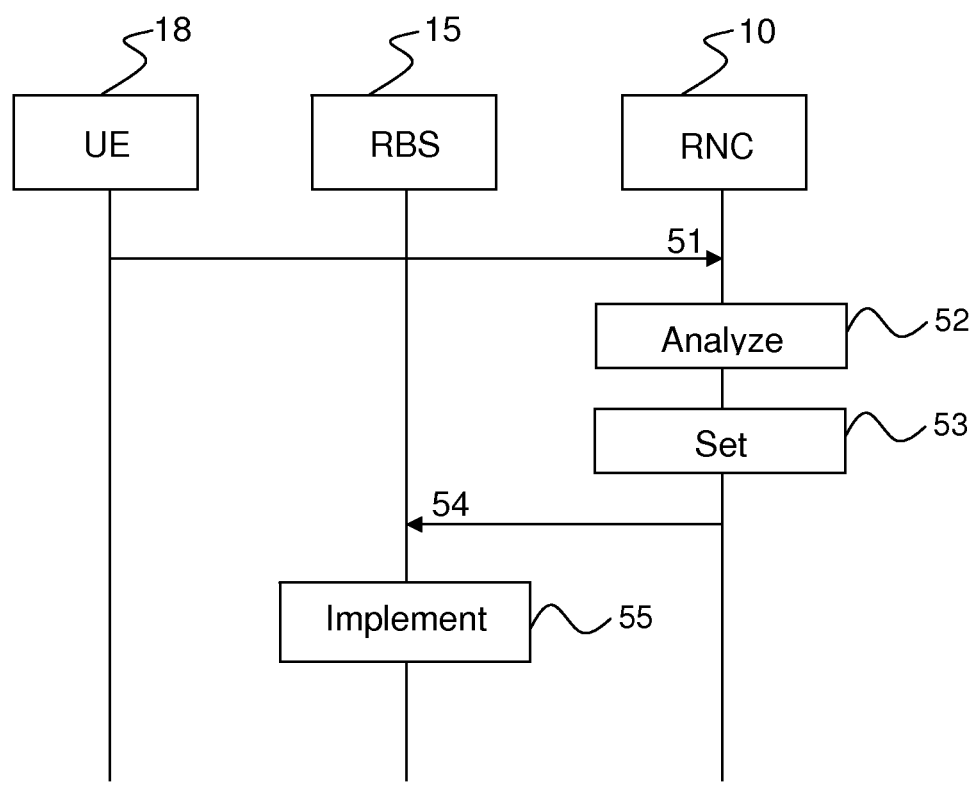
FIG. 2 shows the information transfer between the user equipment, radio base station and a radio network controller node.

FIG. 2 shows the information transfer between a user equipment 18, radio base station 15 and a RNC 10 illustrating the method of maintaining cell coverage in a communication network system in accordance with the present invention. The communication network system comprises a plurality of communication network nodes 15a, 15b communicating with one or more UEs 18. Each network node 15a, 15b is serving at least one cell 19 in which the UEs 18 are situated.

As illustrated in FIG. 2 the method comprises the steps of: 51 collecting measurement reports from the UEs 18 within the at least one cell 19; 52 analyzing collected measurement reports from at least some of the UEs 18 (e.g. the UEs 18 for which maintained coverage is desired, i.e. prioritized UEs) for determining the proximity of these UEs 18 to an uplink coverage limit 20; 53 setting a noise rise threshold based on the determined proximity of these UEs 18 to the uplink coverage limit 20; and 55 implementing the set noise rise threshold in the network node 15a, 15b serving the at least one cell 19.

In one embodiment the step 55 of implementing the set noise rise threshold may comprise the step 54 of communicating the noise rise threshold through updating the maximum total received total wideband power over a node B application part.

In an alternative embodiment the step 55 of implementing the set noise rise threshold may comprise the step 54 of communicating the noise rise threshold over an operation and maintenance interface.

The step 52 of analyzing the collected measurement reports may comprise analyzing at least one of user equipment transmit (UE TX) power information and received signal code power (RSCP) information.

Figure 5:
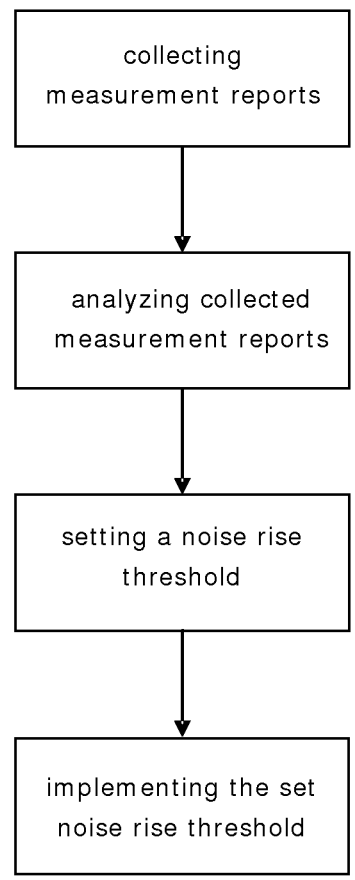
FIG. 5 is a flowchart illustrating the method in accordance with the present invention.

The different steps, as illustrated in FIG. 5, may be summarized as follows.

Initially, UEs 18 sends measurement reports which are collected 51 by the RNC 10. The UEs 18 may send the measurement reports either periodically or event-based.

Thereafter, the RNC 10 analyses 52 the measurement reports of selected UEs 18. By analyzing 52 the UE TX power information and RSCP information in the measurement report of the selected UEs 18 the RNC 10 is able to work out how close to the uplink coverage limit 20 (see FIG. 3) these UEs 18 are.

Following the analysis, if the selected UEs 18 are close to the uplink coverage limit 20, the noise rise threshold may be set to a decreased level in order to increase UL coverage. On the other hand, if the selected UEs 18 are far from the uplink coverage limit 20, the noise rise threshold may be set to an increased level in order to increase HSUPA capacity and peak-rates. If none of the above conditions are fulfilled, the RNC 10 may keep the noise rise threshold at its current level.

Finally, in case the noise rise threshold is changed the RNC 10 communicates 54 the new noise rise threshold to the radio base station 15.

Figure 3:
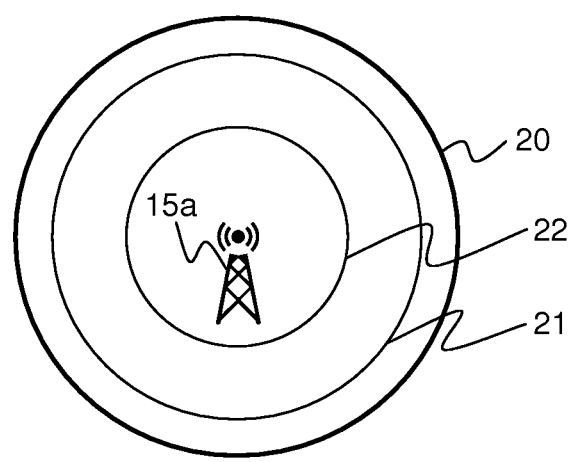
FIG. 3 is a simplified illustration of an uplink coverage limit and predetermined first and second proximities of the uplink coverage limit.

Thus, as illustrated in FIG. 3, in one embodiment the step of setting the noise rise threshold may comprise: decreasing the noise rise threshold if determined that the analyzed UEs 18 are within a predetermined first proximity 21 of the uplink coverage limit 20; and increasing the noise rise threshold if determined that the analyzed UEs 18 are beyond a predetermined second proximity 22 of the uplink coverage limit 20; and maintaining the noise rise threshold at its current level if determined that the analyzed UEs are in-between the predetermined first 21 and second 22 proximities of the uplink coverage limit 20.

The generic principles of the present invention are straightforward except for the analysis performed by the RNC 10. In the following several possible methods for the analysis are described. Each method may be used stand-alone but they may also be combined.

RNC Analysis Method 1—Analysis Based on Periodic UE TX Power Measurements.

In this implementation the analysis is based on UE TX power levels collected from periodic measurement reports sent by the prioritized UEs 18.

The RNC 10 may decide to decrease the noise rise threshold to a lower level if during a time period t1 a fraction larger than F1 of the existing prioritized UEs 18 in the cell has reported a UE TX power level exceeding a level P1. E.g. >5% of existing prioritized UEs 18 has during the last 10 seconds reported power levels exceeding 18 dBm.

Vice versa. The RNC 10 may decide to increase the noise rise threshold to a higher level if during a time period t2 a fraction less or equal to F2 of the existing prioritized UEs 18 has reported a UE TX power level exceeding a level P2. E.g. <=1% of existing prioritized UEs 18 has during the last 10 seconds reported power levels exceeding 15 dBm.

If none of the above criteria are met, the RNC 10 may decide to keep the noise rise target threshold at the current level.

Typically any change of the noise rise threshold is made step wise (one or a few dB at a time) but also pre-defined levels such as noise rise threshold "high" or noise rise threshold "low" may be used.

In order to avoid noise rise target threshold increasing or decreasing to extreme values, an operator may configure a minimum value and a maximum value for the noise rise target threshold.

The timers providing the time periods t1 and t2 should be reset when a change of the noise rise threshold is implemented.

Instead of a fraction of UEs 18 an absolute number may be used in the analysis.

RNC Analysis Method 2—Analysis Based on Periodic RSCP Measurements.

Instead of using the UE TX power level as an indication of how close UEs 18 are to the uplink coverage limit 20, the RSCP level in the measurement report may be evaluated. Based on the reported RSCP level and the setting of a pilot power, an uplink path loss may be calculated. The uplink path loss is a good indication of how close a UE 18 is to the uplink coverage limit 20. The principles for modifying the noise rise thresholds are identical to the ones of RNC analysis method 1 and will not be repeated.

Thus, in the embodiments of RNC analysis method 1 and RNC analysis method 2 the steps of collecting measurement reports from the one or more UEs 18 within the at least one cell 19 comprises receiving periodic measurement reports sent by the one or more UEs 18.

RNC Analysis Method 3—Analysis Based on Event_6.

If it is not desired to initiate periodic measurements for all prioritized UEs 18 it is possible to make use of event based measurement reports.

Event_6a is an event triggered when the UE TX power exceeds a certain configurable level. It is used to indicate to the RNC 10 that the UE 18 is close to the uplink coverage limit 20. A complementary event is event_6b which is sent as the UE TX power falls below a certain configurable level. It is used to indicate to the RNC 10 that a UE 18 is no longer close to the uplink coverage limit 20.

By analyzing event_6a and event_6b for prioritized UEs 18 it is possible to calculate how many UEs 18 that are close to their uplink coverage limit 20, and in turn this may be used to modify noise rise thresholds:

Analogue to RNC Analysis Method 1.

The RNC 10 may decide to decrease the noise rise threshold to a lower level if, during a time period t1 a fraction larger than F1 of the existing prioritized UEs 18 has indicated the state "close to the uplink coverage limit 20".

The RNC may decide to increase the noise rise threshold to a lower value if during a time period t2 a fraction less or equal to F2 of the existing prioritized UEs 18 has indicated the state "close to the uplink coverage limit 20"

If none of the above criteria are met, the RNC 10 may decide to keep the noise rise target threshold at the current level.

Typically any change of the noise rise threshold is made step wise (one or a few dB at a time) but also pre-defined levels such as noise rise threshold "high" or noise rise threshold "low" may be used.

In order to avoid the noise rise target threshold increasing or decreasing to extreme values, an operator may configure a minimum value and maximum value for the noise rise target threshold.

The timers providing the time periods t1 and t2 should be reset when a change of the noise rise threshold is implemented.

Instead of a fraction of UEs 18 an absolute number may be used in the analysis.

Instead of event_6a, which indicates that the UE TX power has exceeded a certain level, event_6d may be used. Event 6d indicates that a UE 18 has reached it maximum TX power.

RNC Analysis Method 4—Analysis Based on Event_2.

Instead of the UE TX power based event_6 the RSCP based event_2 may be used.

Event_2d is triggered when the measured RSCP falls below an operator configurable level and may analogue to event 6a be used to indicate that the UE 18 is "close to the uplink coverage limit 20".

Event_2f is triggered when the measured RSCP exceeds a certain operator configurable level and may analogue to event_6b be used to indicate that a UE 18 is no longer "close the uplink coverage limit 20".

The principles for modifying the noise rise threshold of RNC analysis method 4 are identical to the ones of RNC analysis method 3 and will not be repeated.

Thus, in the embodiments of RNC analysis method 3 and RNC analysis method 4 the steps of collecting measurement reports from the one or more UEs 18 within the at least one cell 19 comprises receiving event based measurement reports sent by the one or more UEs 18.

Handling of Incoming Soft Handover Links.

When analyzing if the noise rise threshold is going to be changed in certain cell 19 the invention as described so far has only considered UEs 18 in this cell 19.

Figure 4:
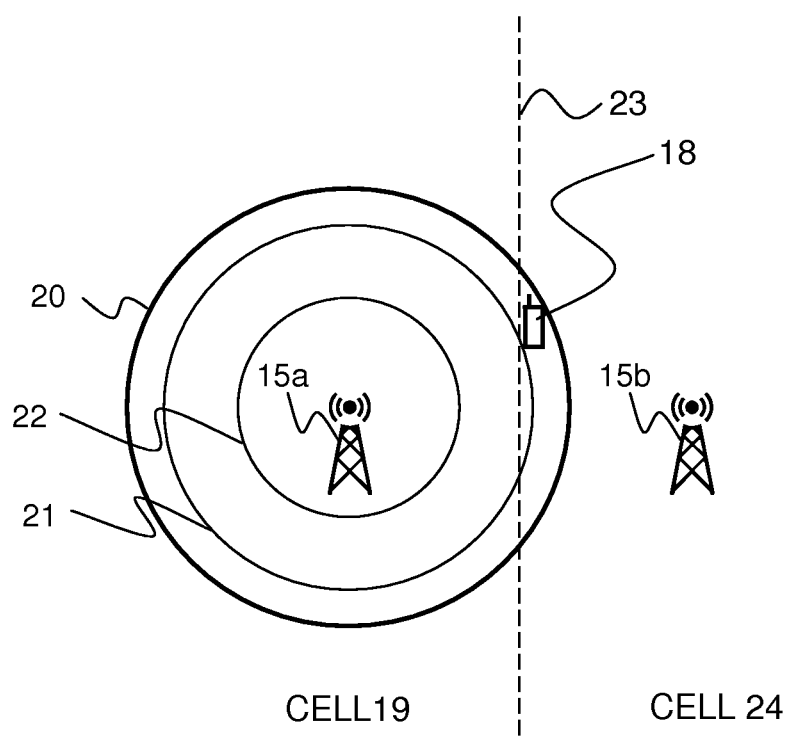
FIG. 4 is a simplified illustration of soft handover in accordance with the present invention.

However, as illustrated in FIG. 4, the present invention may be extended to cover also UEs 18 that want to access this cell 19 from a neighbor cell 24.

The principle is the same as the one previously described. If among the selected prioritized UEs 18 in the neighboring cell 24 the RNC 10 detects a UE 18 that is close to the a cell border 23 between the first cell 19 and the neighboring cell 24 and close to the uplink coverage limit 20 of the first cell 19, then the RNC 10 may lower the noise rise threshold in the first cell 19 to increase the probability for any handover to the first cell 19 to succeed.

Thus, as illustrated in FIG. 4, in order to handle incoming soft handover links the method in accordance with the present invention further comprises: collecting measurement reports from a user equipment 18 within a cell 24 neighbouring to the at least one cell 19 and seeking to access the at least one cell 19; analyzing the collected measurement reports from this user equipment 18 for determining the proximity of this user equipment 18 to the uplink coverage limit 20 of the at least one cell 19 and for determining the proximity of this user equipment 18 to a cell border 23 between the at least one cell 19 and the neighbouring cell 24; lowering the noise rise threshold if determined that the user equipment 18 is within the predetermined first proximity 21 of the uplink coverage limit 20 of the at least one cell 19 and within a predetermined third proximity of a cell border 23 between the at least one cell 19 and the neighbouring cell 24; implementing the lowered noise rise threshold in the network node 15a serving the at least one cell 19.

Figure 6:
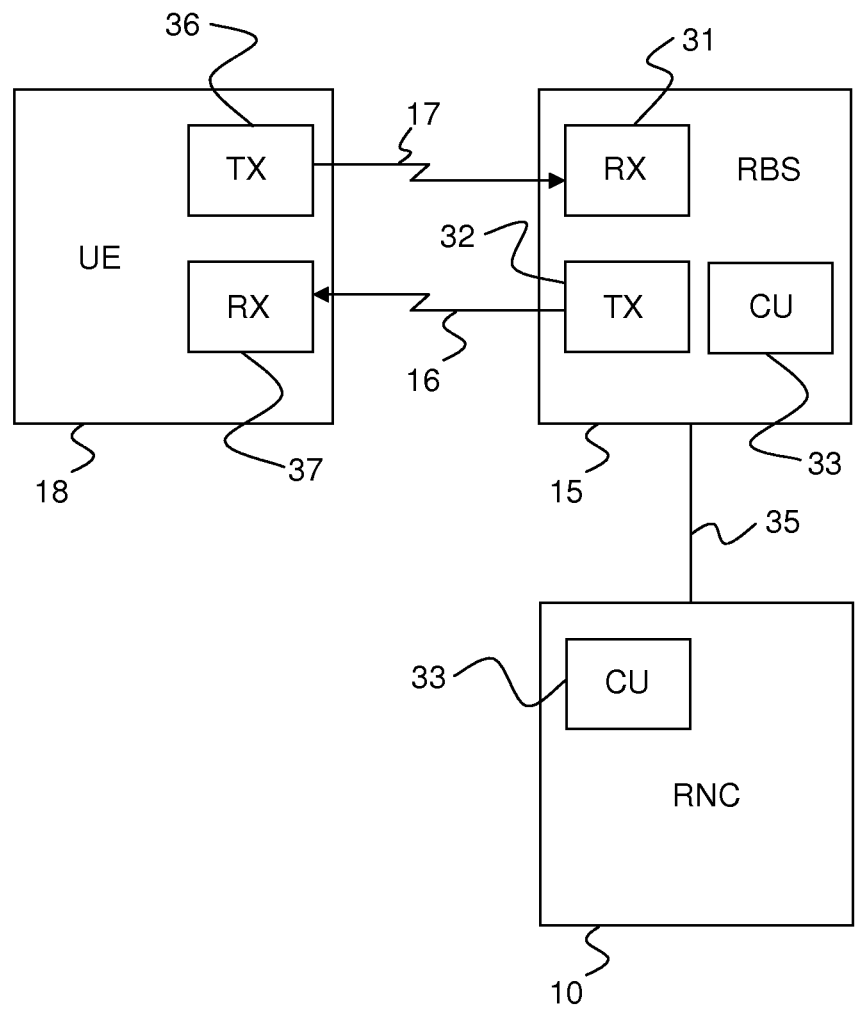
FIG. 6 is a simplified block diagram of a user equipment and an inventive communication network node as well as a radio network controller node.

The present invention further, as illustrated in FIG. 6, relates to an arrangement of maintaining cell coverage in a communication network system comprising a plurality of communication network nodes 15a, 15b communicating with one or more UEs 18. Each network node 15a, 15b is serving at least one cell 19 in which the UEs 18 are situated.

The arrangement in accordance with the present invention comprises: a receiver (RX) 31 arranged to collect measurement reports from the one or more UEs 18 within the at least one cell 19; a RNC 10 arranged to analyze collected measurement reports from at least some of the UEs 18 for determining the proximity of these UEs to an uplink coverage limit 20; the RNC 10 further being arranged to set a noise rise threshold based on the determined proximity of these UEs 18 to the uplink coverage limit 20; a communication arrangement 35 arranged to communicate the set noise rise threshold from the RNC 10 to the network node 15a serving the at least one cell 19 for implementing the set noise rise threshold in that cell 19.

The UEs 18 are usually arranged to receive information transmitted over the downlink channel 16 by a radio interface transmitter (TX) 32. This information is received by the UEs 18 using a radio interface receiver (RX) 37.

In one embodiment the communication arrangement 35 is arranged to communicate the noise rise threshold through updating the maximum total received total wideband power over a node B application part. Alternatively the communication arrangement 35 may be arranged to communicate the noise rise threshold over an operation and maintenance interface.

Further, the RNC 10 may be arranged to analyze at least one of UE TX power information and RSCP information contained in the collected measurement reports.

In a yet further embodiment the RNC 10 may be arranged to set the noise rise threshold through: decreasing the noise rise threshold if determined that the analyzed UEs 18 are within a predetermined first proximity 21 of the uplink coverage limit 20; and increasing the noise rise threshold if determined that the analyzed UEs 18 are beyond a predetermined second proximity of the uplink coverage limit 22; and maintaining the noise rise threshold at its current level if determined that the analyzed UEs 18 are in-between the predetermined first 21 and second 22 proximities of the uplink coverage limit 20, see FIG. 3.

The receiver 31 may either be arranged to receive and collect periodic measurement reports or event based measurement reports sent by the one or more UEs 18.

In order to facilitate incoming soft handover links the receiver 31 may, as illustrated in FIG. 4, further be arranged to collect measurement reports from a user equipment 18 within a cell 24 neighbouring to the at least one cell 19 and seeking to access the at least one cell 19. The radio network controller 10 may further be arranged to analyze the collected measurement reports from this user equipment 18 for determining the proximity of this user equipment 18 to the uplink coverage limit 20 of the at least one cell 19 and for determining the proximity of this user equipment 18 to a cell border 23 between the at least one cell 19 and the neighbouring cell 24. The radio network controller 10 may further be arranged to lower the noise rise threshold if determined that the user equipment 18 is within the predetermined first proximity 21 of the uplink coverage limit 20 of the at least one cell 19 and within a predetermined third proximity of a cell border 23 between the at least one cell 19 and the neighbouring cell 24. The communication arrangement 35 may further be arranged to communicate the lowered noise rise threshold to the network node 15a serving the at least one cell 19.

The present invention further, as also illustrated in FIG. 6, relates to a communication network node 15a for enabling maintained cell coverage in a communication network system comprising a plurality of communication network nodes 15a, 15b communicating with one or more UEs 18. Each network node 15a, 15b is serving at least one cell 19 in which the UEs 18 are situated. The communication network node comprises a receiver 31 arranged to collect measurement reports from the one or more UEs 18 within the at least one cell 19. A RNC 10 is arranged to analyze collected measurement reports from at least some of the UEs 18 for determining the proximity of these UEs 18 to an uplink coverage limit 20. The RNC 10 is further arranged to set a noise rise threshold based on the determined proximity of these UEs 18 to the uplink coverage limit 20. A communication arrangement 35 is arranged to communicate the set noise rise threshold from the RNC 10 to the network node 15a serving the at least one cell 19 for implementing the set noise rise threshold in that cell 19.

The analysis functionality of the RNC 10 may, although described as performed exclusively by the RNC 10 be wholly or partially distributed between subordinate controlling units (CU) 33, which, as illustrated in FIG. 6, may be located within the RNC 10 or alternatively within the network node 15 or yet alternatively distributed between both the RNC 10 and the network node 15.

The present invention, as illustrated in FIG. 6, also relates to a user equipment 18 for enabling maintained cell coverage in a communication network system, the UE 18 being arranged to transmit measurement reports comprising at least one of UE TX power information and RSCP information over a radio interface transmitter (TX) 36 in a communication network system comprising communication network nodes 15a, 15b each serving at least one cell 19 in which the UEs 18 are situated. The information in the measurement reports is adapted to facilitate analysis by a RNC 10 for determining the proximity of the UE 18 to an uplink coverage limit 20. The information in the measurement reports is further adapted to facilitate setting by the RNC 10 of a noise rise threshold based on the determined proximity of the UE 18 to the uplink coverage limit 20. Furthermore, the information in the measurement reports is adapted to facilitate communication by a communication arrangement 35 of the set noise rise threshold from the RNC 10 to the network node 15a serving the at least one cell 19 for implementing the set noise rise threshold in that cell 19.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

Expressions such as "including", "comprising", "incorporating", "consisting of", "have", "is" used to describe and claim the present invention are intended to be construed in a non-exclusive manner, namely allowing for items, components or elements not explicitly described also to be present. Reference to the singular is also to be construed to relate to the plural and vice versa.

Numerals included within parentheses in the accompanying claims are intended to assist understanding of the claims and should not be construed in any way to limit subject matter claimed by these claims.

The invention claimed is:

1. A method of maintaining cell coverage in a communication network system comprising a plurality of communication network nodes communicating with one or more user equipments, where each network node is serving at least one cell in which the one or more user equipments are situated, the method comprising:
    collecting measurement reports from the one or more user equipments within the at least one cell;
    analyzing collected measurement reports from at least a subset of the one or more user equipments for determining a proximity of this subset of user equipments to an uplink coverage limit;
    setting a noise rise threshold based on the determined proximity of this subset of user equipments to the uplink coverage limit; and
    implementing the noise rise threshold in the network node serving the at least one cell.

2. The method according to claim 1, wherein the step of implementing the noise rise threshold comprises:
    communicating the noise rise threshold through updating the maximum total received total wideband power over a node B application part.

3. The method according to claim 1, wherein the step of implementing the noise rise threshold comprises:
    communicating the noise rise threshold over an operation and maintenance interface.

4. The method according to claim 1, wherein the step of analyzing the collected measurement reports comprises analyzing at least one of user equipment transmit power information and received signal code power information.

5. The method according to claim 1, wherein the step of setting the noise rise threshold comprises:
    decreasing the noise rise threshold in response to determining that the analyzed subset of user equipments are within a predetermined first proximity of the uplink coverage limit;
    increasing the noise rise threshold in response to determining that the analyzed subset of user equipments are beyond a predetermined second proximity of the uplink coverage limit; and
    maintaining the noise rise threshold at its current level in response to determining that the analyzed subset of user equipments are in-between the predetermined first and second proximities of the uplink coverage limit.

6. The method according to claim 1, wherein the step of collecting measurement reports from the one or more user equipments within the at least one cell comprises receiving periodic measurement reports sent by the one or more user equipments.

7. The method according to claim 1, wherein the step of collecting measurement reports from the one or more user equipments within the at least one cell comprises receiving event based measurement reports sent by the one or more user equipments.

8. The method according to claim 1, further comprising:
    collecting measurement reports from a particular user equipment within a cell neighbouring to the at least one cell and seeking to access the at least one cell;
    analyzing the collected measurement reports from the particular user equipment for determining a proximity of the particular user equipment to the uplink coverage limit of the at least one cell and for determining the proximity of the particular user equipment to a cell border between the at least one cell and the neighbouring cell;
    lowering the noise rise threshold if determined that the particular user equipment is within the predetermined first proximity of the uplink coverage limit of the at least one cell and within a predetermined third proximity of a cell border between the at least one cell and the neighbouring cell; and
    implementing the lowered noise rise threshold in the network node serving the at least one cell.

9. An arrangement for maintaining cell coverage in a communication network system comprising a plurality of communication network nodes communicating with one or more user equipments, where each network node is serving at least one cell in which the one or more user equipments are situated, the arrangement comprising:
    a receiver arranged to collect measurement reports from the one or more user equipments within the at least one cell;
    a radio network controller arranged to analyze collected measurement reports from at least a subset of the one or more user equipments for determining a proximity of the subset of the one or more user equipments to an uplink coverage limit and further arranged to set a noise rise threshold based on the determined proximity of the subset of the one or more user equipments to the uplink coverage limit; and a communication arrangement arranged to communicate the set noise rise threshold from the radio network controller to the network node serving the at least one cell for implementing the set noise rise threshold in that cell.

10. The arrangement according to claim 9, wherein the communication arrangement is arranged to communicate the noise rise threshold through updating the maximum total received total wideband power over a node B application part.

11. The arrangement according to claim 9, wherein the communication arrangement is arranged to communicate the noise rise threshold over an operation and maintenance interface.

12. The arrangement according to claim 9, wherein the radio network controller is arranged to analyze at least one of user equipment transmit power information and received signal code power information contained in the collected measurement reports.

13. The arrangement according to claim 9, wherein the radio network controller is further arranged to set the noise rise threshold through:
decreasing the noise rise threshold if determined that the analyzed subset of user equipments are within a predetermined first proximity of the uplink coverage limit;
increasing the noise rise threshold if determined that the analyzed subset of user equipments are beyond a predetermined second proximity of the uplink coverage limit; and
maintaining the noise rise threshold at its current level if determined that the analyzed subset of user equipments are in-between the predetermined first and second proximities of the uplink coverage limit.

14. The arrangement according to claim 9, wherein the receiver is arranged to receive and collect periodic measurement reports sent by the one or more user equipments.

15. The arrangement according to claim 9, wherein the receiver is arranged to receive and collect event based measurement reports sent by the one or more user equipments.

16. The arrangement according to claim 9, wherein:
the receiver is further arranged to collect measurement reports from a user equipment within a cell neighbouring to the at least one cell and seeking to access the at least one cell;
the radio network controller is further arranged to analyze the collected measurement reports from this user equipment for determining the proximity of this user equipment to the uplink coverage limit of the at least one cell and for determining the proximity of this user equipment to a cell border between the at least one cell and the neighbouring cell;

the radio network controller is further arranged to lower the noise rise threshold if determined that the user equipment is within the predetermined first proximity of the uplink coverage limit of the at least one cell and within a predetermined third proximity of a cell border between the at least one cell and the neighbouring cell; and the communication arrangement is further arranged to communicate the lowered noise rise threshold to the network node serving the at least one cell.

17. A communication network node for enabling maintained cell coverage in a communication network system comprising a plurality of communication network nodes communicating with one or more user equipments, where each network node is serving at least one cell in which the one or more user equipments are situated, the communication network node comprising:
a receiver arranged to collect measurement reports from the one or more user equipments within the at least one cell;
a radio network controller arranged to analyze collected measurement reports from at least a subset of the one or more user equipments for determining the proximity of the subset of the one or more user equipments to an uplink coverage limit and further arranged to set a noise rise threshold based on the determined proximity of the subset of the one or more user equipments to the uplink coverage limit; and
a communication arrangement arranged to communicate the set noise rise threshold from the radio network controller to the network node serving the at least one cell for implementing the set noise rise threshold in that cell.

18. A user equipment for enabling maintained cell coverage in a communication network system, the user equipment being arranged to transmit measurement reports comprising at least one of user equipment transmit power information and received signal code power information over a radio interface in a communication network system comprising communication network nodes each serving at least one cell, wherein the information in the measurement reports is adapted to facilitate:
analysis by a radio network controller for determining a proximity of the user equipment to an uplink coverage limit;
setting by the radio network controller of a noise rise threshold based on the determined proximity of the user equipment to the uplink coverage limit; and
communication by a communication arrangement of the set noise rise threshold from the radio network controller to the network node serving the at least one cell for implementing the set noise rise threshold in that cell.

* * * * *

UNITED STATES PATENT AND TRADEMARK OFFICE
CERTIFICATE OF CORRECTION

| | | |
|---|---|---|
| PATENT NO. | : 8,644,871 B2 | Page 1 of 1 |
| APPLICATION NO. | : 13/254538 | |
| DATED | : February 4, 2014 | |
| INVENTOR(S) | : Ljung | |

It is certified that error appears in the above-identified patent and that said Letters Patent is hereby corrected as shown below:

In the Specification

In Column 3, Line 58, delete "node;" and insert -- node. --, therefor.

In Column 8, Line 13, delete "uplink coverage limit 22;" and insert -- uplink coverage limit 20; --, therefor.

Signed and Sealed this
Sixteenth Day of September, 2014

Michelle K. Lee
*Deputy Director of the United States Patent and Trademark Office*